Dec. 7, 1926.　　　　　　　　　　　　　　　　　1,609,952
J. LEDWINKA
DETACHABLE UPHOLSTERY FOR VEHICLE BODIES
Filed June 30, 1923　　　4 Sheets-Sheet 3

WITNESS:—
Walter M. Trout.

INVENTOR.
JOSEPH LEDWINKA
BY
C. B. Desjardins
ATTORNEY

Dec. 7, 1926.                                              1,609,952
                        J. LEDWINKA
            DETACHABLE UPHOLSTERY FOR VEHICLE BODIES
                  Filed June 30, 1923        4 Sheets-Sheet 4
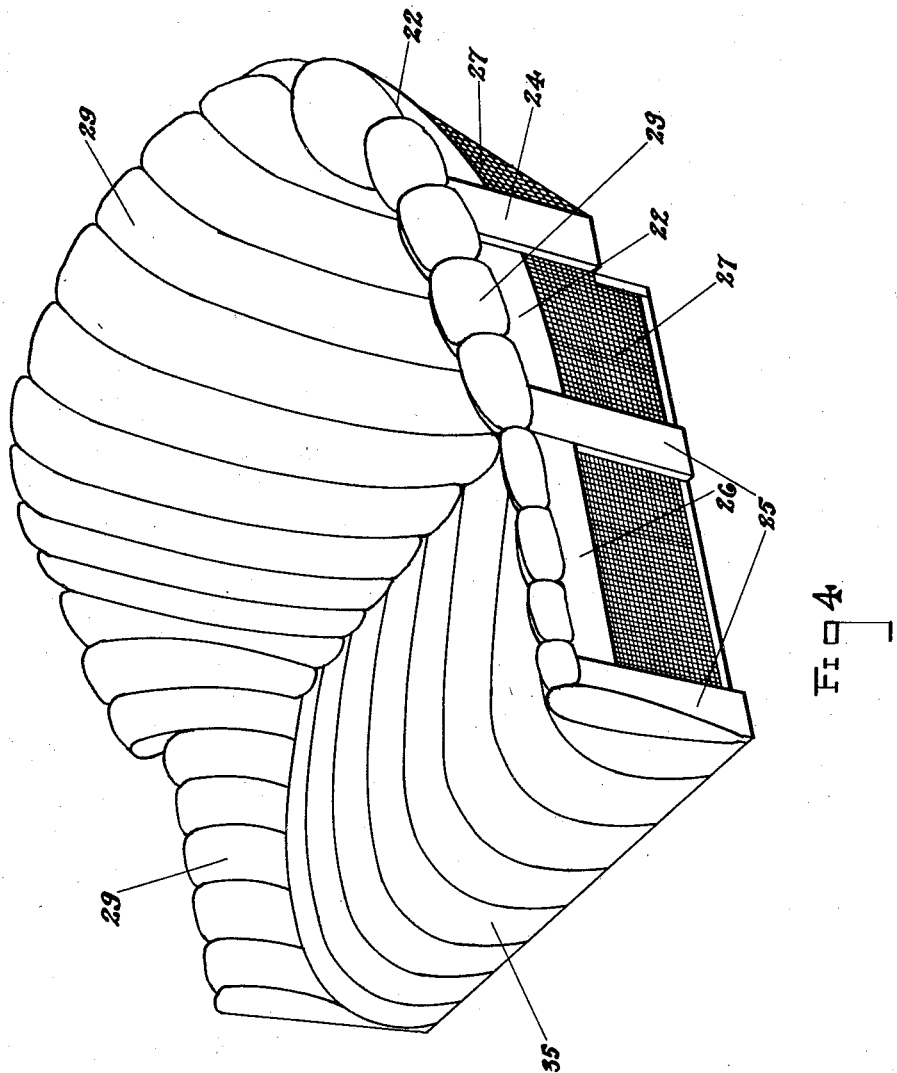
WITNESS:—
Walter M. Trout
INVENTOR.
JOSEPH LEDWINKA
BY C. B. Desjardins
ATTORNEY Patented Dec. 7, 1926.

1,609,952

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

DETACHABLE UPHOLSTERY FOR VEHICLE BODIES.

Application filed June 30, 1923. Serial No. 648,683.

My invention relates to improvements in detachable upholstery for vehicle bodies and it has to do, more particularly, with the construction of detachable or removable upholstery units of a nature suitable for use in connection with automobile bodies.

For many years, it has been the practice to upholster automobile bodies after they are completed. In doing this, it has been customary to tack the upholstery to wooden tacking strips fastened to the body. This permits the upholsterer to do a very fine and finished job, as the upholstering may be fitted to the curves and contours of the body and the finished upholstery will be a very perfect piece of work. However, this work has had to be done, in this case, on the finished body and, since it consumes quite a good deal of time, the body is tied up in the upholstering or trimming department for a considerable period of time and quite a large amount of floor space is necessary. This is an important factor which adds materially to the cost, particularly in factories producing a large number of automobile bodies and in which the daily production is very large.

The main object of my present invention is to provide an improved construction by means of which the upholstery is rendered detachable from the automobile body, so that the upholstering may be completed apart from the body and then mounted in the body by a few very simple operations, which can be performed very quickly and easily, and so that the upholstery may be easily removed from the body for purposes of renewal or repair.

A further object of my present invention is to provide a detachable upholstery construction which substantially duplicates the perfection and finish of upholstery built into the body but which, nevertheless, permits the upholstering to be carried on apart from the body and to be mounted thereon very quickly and easily.

A further object of my present invention is to povide a detachable unit, comprising the entire upholstering of an automobile body seat, of such a nature that it may be readily fastened to the automobile body, under stress or tension, so as to prevent rattling and squeaking in use.

A further object of my present invention is to provide a removable or detachable frame which carries the upholstery for an automobile body seat and which may be secured to the automobile body in such a way that the structure is tensioned or stressed, when secured in place, and so that the securing means for such unit may be concealed and covered by the usual removable seat bottom or cushion.

A further object of my present invention is to provide a detachable or removable upholstery frame or unit which receives the upholstering and which may be constructed largely of wood and applied to the automobile body, after the metal shell of said body has been enameled and baked, without disturbing or marring the finish thereof.

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which:

Fig. 4 is a perspective view of said detachable or removable upholstery unit, removed from the automobile body, the seat cushion being shown in place therein.

In the drawings, the same reference numerals refer to the same parts throughout the several views.

My invention consists in providing a frame which is shaped to conform to the sides and back of the automobile body seat, in which it is to be fitted and secured, and which is also provided with a bottom. This frame has the upholstering for the sides and back of the seat secured thereto in the usual manner. I propose to provide a laterally-extending flange at the upper edge of the metal shell or panel forming the sides and back of the body seat and to provide said frame with a corresponding shoulder or ledge which is adapted to rest upon said flange when the upholstery unit is secured in place. I propose to secure the unit in place by bolts, or other suitable fastening means, extending through the bottom of the frame and through suitable cross members of the automobile body and these fastening members may be concealed by the removable seat cushion which rests upon the bottom of the frame. It is essential, of course, that this unit shall be so secured in place that it will not rattle or squeak when the body is in use, and I propose to accomplish this by securing the unit in place, in the body, under tension or stress.

Figure 1:
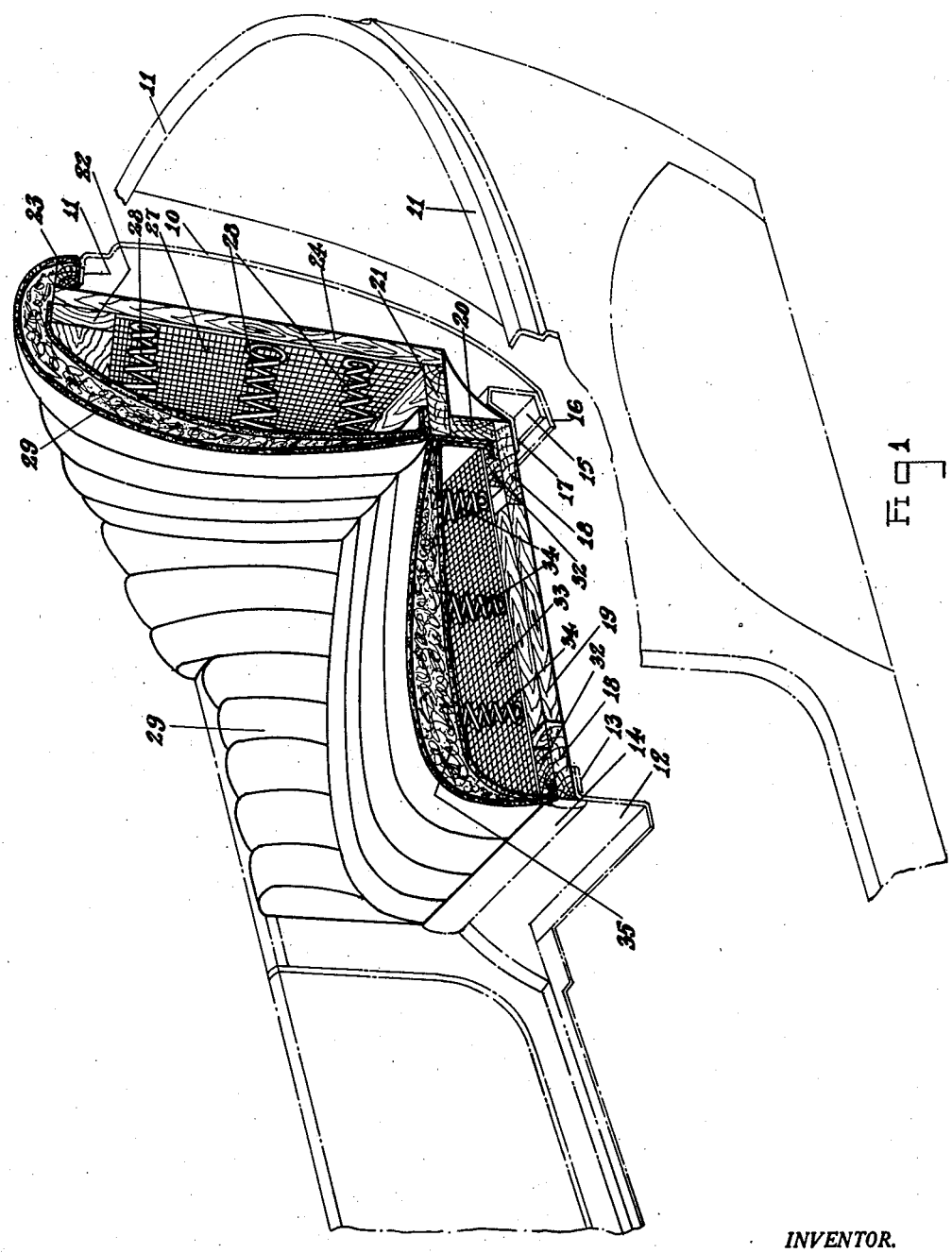
Fig. 1 is a sectional, perspective view of detachable upholstery, constructed in accordance with my invention, applied to the rear seat of an automobile body, the automobile body being indicated by dot and dash lines.
Figure 2:
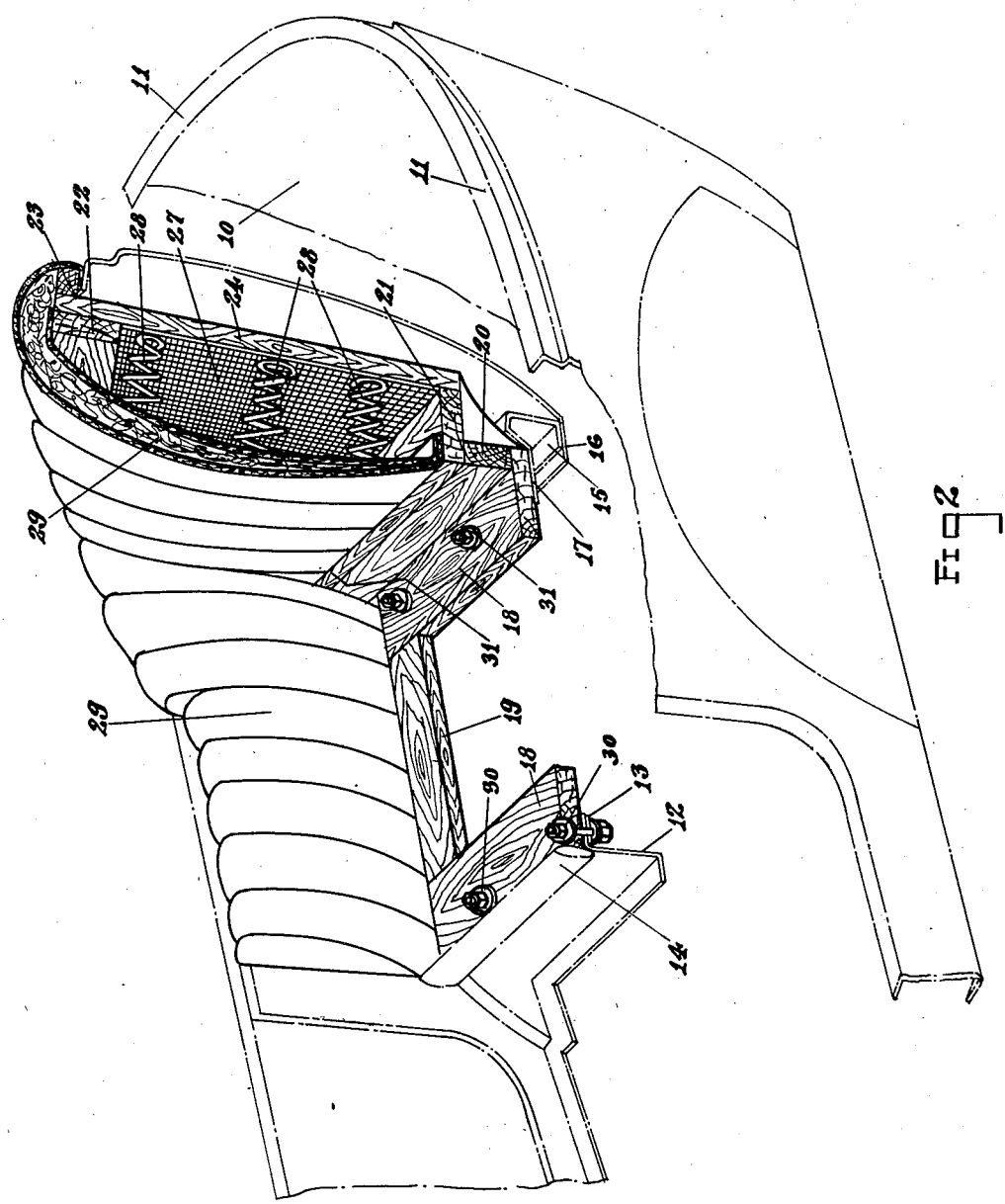
Fig. 2 is a view similar to Fig. 1, but with the seat cushion removed, showing the means for securing the upholstery unit in place.

Referring to the numbered parts of the accompanying drawings, in which I have illustrated a construction constituting one embodiment of my invention, it will be seen that the automobile body is indicated in Figs. 1 and 2 by dot and dash lines. The tonneau panel, 10, which is curved to form the sides and back of the rear seat of the automobile body, has an inwardly-extending flange, 11, at its upper edge. A Z-shaped cross member, 12, extends from one side of the body to the other, slightly in the rear of the rear door openings, and constitutes the heel board at the front edge of the rear seat. A cushion-retaining strip, 14, is secured to the laterally-extending flange, 13, at the upper edge of the heel board, 12. The rear portion of the tonneau panel, 10, is flanged forwardly beneath, at 16, and secured to the rear cross member, 15, which, in this case, is a metal channel member having a forwardly-extending flange, 17, at its upper edge.

Figure 3:
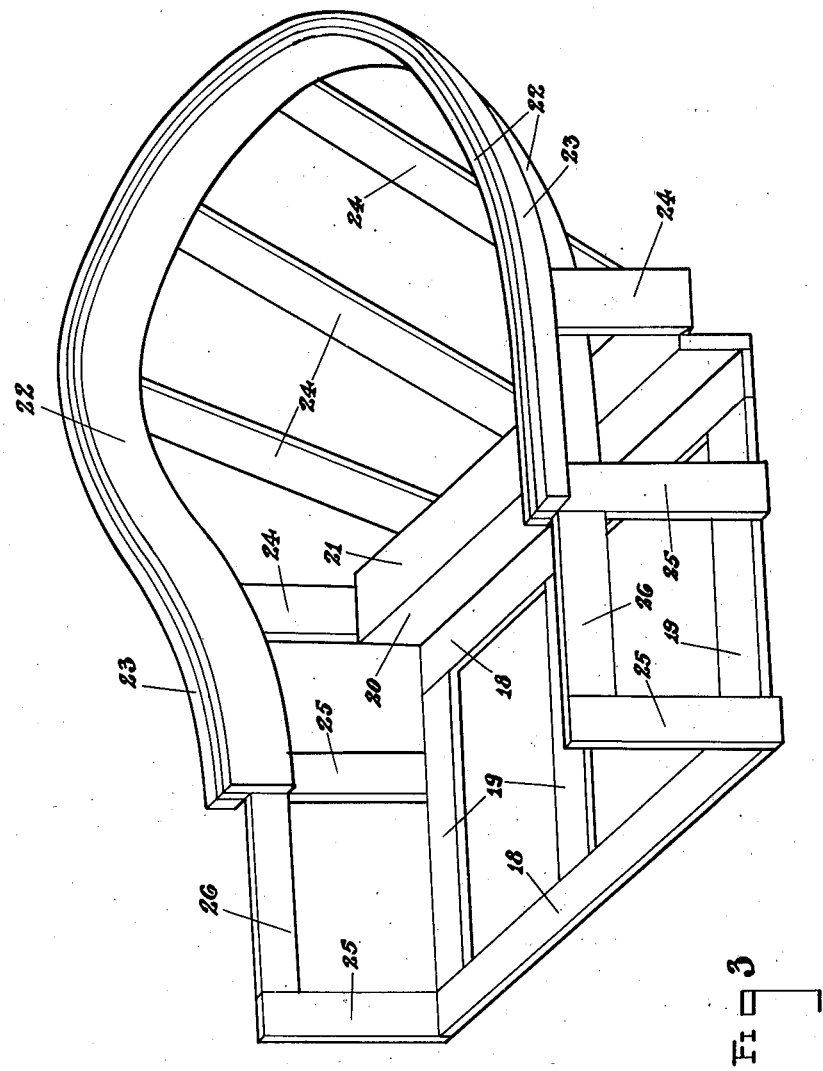
Fig. 3 is a perspective view of the detachable frame of the unit, upon which the upholstering is fastened.

The frame of the removable or detachable upholstery unit is illustrated in Fig. 3. This frame has a seat bottom formed by the transverse members, 18, connected by the cross members, 19. To the rear transverse member, 18, there is secured a riser, 20, the upper edge of which is secued to the transverse member, 21, to which the lower portions of the upholstering for the rear of the seat are secured. The upper edge of the frame is formed by a member, 22, which is curved to conform to the sides and back of the tonneau panel and is connected to and supported by the seat bottom, through the upright members, 24 and 25, the lower ends of the upright members, 24, being fastened to the transverse member, 21, while the uprights, 25, are fastened to the cross members, 19. A strip, 23, which conforms in curvature to the member, 22, is secured thereto so as to form an overhanging ledge at the upper edge of this frame, for a purpose which will be described hereinafter. This ledge stops short of the forward corners of the frame and the member, 22, is continued by the members, 26, connecting the upper ends of the uprights, 25. The upholstering, 29, is secured to this frame in any suitable manner. In the particular embodiment illustrated, a wire mesh, 27, is fastened to the uprights, 24 and 25, so as to form a backing for the upholstering and for the springs, 28, which are interposed between said wire mesh and the leather, or other upholstering material, which, of course, may be padded in the usual manner. At the upper edge of the frame, the upholstering material is carried around and tacked to the lower surface of the ledge, 23, so that this raw edge is concealed when the upholstery unit is secured in place.

This detachable upholstery unit fits in the automobile body with the ledge 23 resting upon the flange 11 at the upper edge of the tonneau panel and the transverse member 18 of the seat bottom of the frame resting upon the flange 13 of the body cross member 12. The transverse member 18 at the rear of the upholstery frame unit does not normally rest upon the flange 17 by reason of the fact that the overhanging ledge 23 and the front transverse member 18 are the only supports for the upholstery unit before it is finally secured in position in the body. Bolts 30 and 31, which pass through the transverse members 18 in the bottom of the upholstery frame and through the flanges 13 and 17, are provided for the purpose of securing the unit in place. There is a certain amount of yield or resilience in the flange 11 and tonneau panel 10 so that, when the unit is properly positioned and the bolts 30 and 31 are drawn tight, the unit is held in place under tension or stress with the rear transverse member 18 founded securely upon the flange 17. The upper and lower edges of the panel 10 are thus effectively engaged by the upholstery unit in such manner that the panel 10 is flexed outwardly with the result that all squeaking or rattling of the unit in the body is effectively precluded. The bolts, 30 and 31, are concealed by the removable seat cushion, having the seat bottom, 32, the wire mesh, 33, secured thereto, the springs, 34, and the upholstering, 35, covering said spring. This seat cushion is of the usual construction and fits between the riser, 20, and the cushion-retaining strip, 14, and, when in position, covers the bolts, 30 and 31.

It will be seen that the removable frame made up of the members, 18, 19, 20, 21, 22, 23, 24, 25 and 26, which may well be wooden members, may be upholstered in exactly the same way that upholstering has been applied heretofore, when built into the automobile body. This permits the workman to use exactly the same skill and perfection, which he has been accustomed to use in upholstering an automobile body, and yet the upholstering may be done without tying up the body for any considerable period of time and thus interfering with production. It will be evident that these frames may be upholstered on the work-bench and then applied to the body after the latter has been enameled and baked, or otherwise finished, and that these units may be mounted in the body very quickly and easily. The removable seat cushion will conceal the fastening bolts, by which the unit is secured in place, and when the unit is mounted and secured in position it will simulate the built-in type of upholstery so well that one cannot tell the difference.

I am aware that the particular embodiment, illustrated in the accompanying drawing, may be varied considerably without departing from the spirit of my invention and, therefore, I claim my invention broadly, as indicated by the appended claim.

Having thus described my invention, what I claim as new and useful and desire to secure by Letters Patent is:

In combination, an automobile body comprising side and back body panels, a transverse connecting member between the side panels, a unitary seat upholstery frame having a seat bottom portion and a seat back portion, which frame is supported principally in two regions, one near its bottom forward edge by said transverse member and the other near the upper back edge from said body back panel, and securing means intermediate said regions of support adapted to place the unitary structure between said regions in tension as a whole.

In testimony whereof, I affix my signature.

JOSEPH LEDWINKA.